United States Patent [19]
Davis et al.

[11] 3,872,001
[45] Mar. 18, 1975

[54] REMOVAL OF HEAVY METAL POLLUTANTS FROM AQUEOUS MEDIA

[75] Inventors: Howard J. Davis, Warren, N.J.; Leonard A. Lee, Rockville, Md.

[73] Assignee: Celanese Corporation, New York, N.Y.

[22] Filed: May 31, 1973

[21] Appl. No.: 365,792

[52] U.S. Cl.................. 210/58, 210/59, 75/101 BE
[51] Int. Cl............................................ C02b 1/18
[58] Field of Search ............ 210/23, 58, 59, 56, 38, 210/500, 502; 75/101 BE; 106/163, 196

[56] References Cited
UNITED STATES PATENTS

| | | |
|---|---|---|
| 2,980,607 | 4/1961 | Mock et al......................... 210/502 |
| 3,580,891 | 5/1971 | Rainer ................................. 210/38 |
| 3,715,339 | 2/1973 | Rainer ................................. 210/38 |
| 3,779,907 | 12/1973 | Li et al. ............................... 210/59 |

*Primary Examiner*—Frank A. Spear, Jr.
*Assistant Examiner*—Benoit Castel

[57] ABSTRACT

A porous film is disclosed which is capable of removing heavy metal pollutants from aqueous media. The film is basically prepared from an acid-containing polymer which has been rendered porous or microporous by standard methods. Reacted with the acid groups in the polymeric film backbone is a chelate-divalent metal complex which chelate is capable of forming a complex with the heavy metal pollutants to be removed from the aqueous media.

5 Claims, 5 Drawing Figures

REMOVAL OF MERCURY BY UNTREATED FILMS
(No NaCl)

REMOVAL OF CADMIUM BY EDTA-TREATED AND UNTREATED FILMS (No NaCl)

REMOVAL OF CADMIUM BY EDTA-TREATED AND UNTREATED FILMS (1000 ppm NaCl)

REMOVAL OF HEAVY METAL POLLUTANTS FROM AQUEOUS MEDIA

BACKGROUND OF INVENTION

Increasingly, investigations are being made to determine the best means for removing any of a large number of pollutants from our environment. Two basic approaches have been involved. In the first the pollutant is removed from the environment after it has been released. The second involves removal of the pollutant from its source before release into the environment. In the area of water pollution heavy metals such as mercury have caused increasing concern over their effect on edible fishes, and in turn, their effect on man in his consumption of these fishes. Therefore, various methods have been investigated for removing this pollutant after it has been released. While several methods of removing heavy metal pollutants from water are available, they all have the basic disadvantage that the removing means can be regenerated and reused only with great difficulty and cost. It is an object of this invention to provide a low cost, easy to use, and efficient method of removing heavy metal pollutants in ionic form from aqueous media. In addition, it is an object of this invention to prepare a heavy metal pollutant removing system which can be regenerated and used continuously for long periods of time.

SUMMARY OF INVENTION

It has now been discovered that various polymeric, acid-containing, porous films when subject to reaction with divalent metal chelates, produce films which are extremely efficient in their capacity to remove heavy metal pollutants, such as mercury, cadmium, copper and nickel from aqueous media. While several methods are available for preparing acid-containing films, in most cases the films herein are prepared by utilizing a polymer containing free hydroxyl groups and reacting that polymer with a polyfunctional free acid or anhydride to produce an acid-containing polymer which can be cast into a porous, flexible-base film. The desired divalent metal chelate, preferably in its divalent metal complex form, is then passed through the porous, acid-containing, flexible-base film causing chelation of the base film. The preferred chelating agent is ethylenediaminetetracetic acid.

Passage of aqueous media containing heavy metal (ions) pollutants through this film causes the removal of the heavy metal pollutant. The film may then be regenerated by treatment with a regenerating agent such as thiocyanate ions.

DETAILED DESCRIPTION OF THE INVENTION

Figure 1:
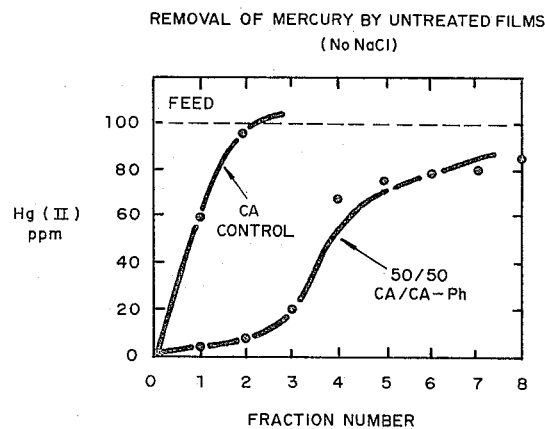

Several routes are available for preparing the acid-containing polymeric films which are reacted with the chelating agents of this invention. No matter which method is used, however, the films which are used must be substantially water insensitive and should be flexible.

One route to preparing the films of the instant invention involves the utilization of polymers containing acidreactive hydroxyl groups. Generally, any type of polymer containing a substantial number of free hydroxyl groups, at least 0.01 to 3 or more per gram, may be utilized in the invention with the proviso that the polymer be film-forming, and that the film be capable of being rendered porous, preferably microporous.

Examples of the types of polymers which may be utilized include polyolefins, polyacetals, polyamides, polyesters, polyalkylene sulfides and polyarylene oxides, which have been co-polymerized with minor amounts of hydroxy-containing monomers. Likewise, hydroxy-contained acrylics and cellulosics may be utilized. Thus, in general, any hydroxy-containing polymer may be utilized, which polymer is preferably capable of being formed into a film which may be rendered porous, preferably microporous. The hydroxy-containing polymer may be either formed into a film and then reacted with a di-basic acid or anhydride or it may be first reacted with a poly-basic acid or polyfunctional anhydride and then formed into a film and rendered micro-porous. It may also be used in granular form in a bed or a column.

Among the poly-basic acids or anhydrides which may be utilized herein are included aromatic acids and anhydrides, such as phthalic acid and anhydride, isophthalic acid, terephthalic acid, etc., the aliphatic acids and their anhydrides, such as adipic acid, succinic acid, azelaic acid, sebasic acid, and the unsaturated di-basic acids and their anhydrides, such as fumaric acid and maleic acid. The anhydrides, however, are preferred for their ease of reaction with free hydroxyl groups. In addition, sulfonic acids may be utilized herein place of carboxylic acids. Furthermore, tri- and poly-basic acids, such as trimelitic anhydrides and pyromellitic anhydrides may also be utilized. Polybasic sulfonic acids may be used in place of the polybasic carboxylic acids listed.

Instead of utilizing hydroxyl-containing polymeric films which must then be reacted with poly-basis acids as previously disclosed, it is possible to prepare the polymers of the instant invention by utilizing acid-containing base polymers. Examples of such free acid-containing polymers include acrylic acid-based polymers, polyester polymers wherein an excess of acid is utilized, and natural acid-containing polymers such as alginic acid, and lignin acids.

Where a hydroxyl-containing prepolymer is utilized, it should preferably first be reacted with the poly-basic acid or anhydride before it is formed into a film. Thus, the hydroxyl-containing polymer should be measured out and the desired amount of the polyfunctional acidic reactant added slowly until sufficient reaction has occurred. Preferably an anhydride which may be opened by primary aliphatic hydroxyl groups at the normal reaction temperatures is utilized. Where acids are utilized in place of anhydrides, care must be taken to see that an excess of cross-linking does not occur, causing gelation or rapid increase in the molecular weight of the hydroxyl polymer. After the desired amount of reaction has occurred, the carboxylated (or other acid groups) polymer may be extruded into film form by any of the well-known film-formation methods.

The films which are prepared herein in either the hydroxy-containing polymeric form or the pre-reacted acid-containing polymeric form, may be rendered porous by several varying means, all well-known in the art. For example, the film may be drawn out in a sheet and then subject to corona discharge or chemical etching or to physical punching by any of a variety of film perforators. In addition, micro-porous films, including reverse osmosis-type films, may be prepared by solvent leaching methods as disclosed in U.S. Pat. No. 3,378,507. The membranes may also be prepared by the methods disclosed in U.S. Pat. No. 3,426,754, all of which are specifically incorporated herein by reference.

Instead of forming the membranes herein into porous or micro-porous films, they may also be formed into hollow filamentary membranes and then utilized in that fashion. The hollow filimentary membranes may be prepared according to methods well known in the art as disclosed in U.S. Pat. Nos. 3,133,132 and 3,567,632. The films are generally prepared by extruding the polymeric solution through a circular dye to form a straw-like or hollow filamentary tube.

After the acid-containing film has been prepared, it must then be treated with the chelating agent, preferably in the form of its divalent metal complex. (Of course, it is recognized that the chelating agent may be introduced into the polymeric backbone prior to the film or filament formation step, although this is not preferred.)

Examples of the chelating agents which may be utilized herein include:

Nitrilotriacetic acid
Ethylenediaminetetrapropionic acid
Trimethylenediamine tetra-acetic acid
1,4-Diaminocyclohexane-N,N'-tetra-acetic acid
N-Benzylethylenediamine triacetic acid and the like.

Most preferred among the chelating agents is ethylene-diaminetetraacetic acid.

In any event only those chelating agents should be utilized which are not subject to water degradation and which preferably exhibit a difference of at least 3 points between the log of the stability constant of their sodium and their mercury complexes. This difference allows the use of the instant invention in saline aqueous solution and assures that the chelating agent is not poisoned by metal salts which there is no need to remove.

In actual operating procedure preferably divalent metal salt is first reacted with the chelating agent to form a divalent metal chelate. Examples of the divalent metals which may be utilized include Barium, Calcium and Magnesium.

This composition is then reacted with the acid-containing polymer to fix the metal-chelate to the polymer substrate.

The films utilizable in the instant invention are treated with the divalent metal chelate by dissolving the chelate or its water soluble salt in an aqueous solution and then passing the solution over, around, and through the film. This affects the above reaction and complexes the chelates with the film.

In operation, the film bed or column which has been utilized to remove the heavy metal pollutants from water may be regenerated by reaction with certain regenerative ions which when passed over the metal complex form a more stable complex with the heavy metal pollutant ion such as mercury than is formed between the chelated substrate and the heavy metal pollutant. An example of such a regenerative ion for mercury and EDTA complexes is potassium or sodium thiocyanate.

Thus, following a period of use, the film may be circulated through a diluted aqueous solution of thiocyanate ions. The mercury thiocyanate salt is then precipitated out of solution and the corresponding potassium EDTA complex is reformed and the films re-utilized.

In continuous operation a preferred method involves the use of a long belt of the desired acid-containing film. Water is passed through it and the belt is continuously moved from contact with the polluting water to contact with a thiocyanate solution which acts to regenerate the chelating sites on the belt.

EXAMPLES OF INVENTION

EXAMPLE 1

Cellulose secondary acetate having a degree of hydroxyl substitution of about 2 is reacted with excess phthalic anhydride in the presence of pyridine. The evaluation of the resulting product shows that about 60 percent of the available free hydroxyl groups were esterified with anhydride. The resulting polymer along with an equal weight of cellulose acetate (commercial secondary acetate) was dissolved in a 60-40 by weight solution of acetone-formamide to obtain a dope with 22 percent solids (by weight) which was then cast to form an asymmetric membrane according to the following procedure:

To 235 parts of 60-40 acetone-formamide are added 33 parts of cellulose acetate-phthalate (CA-Ph) prepared as described above and 33 parts of cellulose acetate (CA) of 55.1 acetyl value. The entire mixture was tumbled slowly in a container to dissolve the cellulose esters, i.e., until a clear, viscous solution (dope) was obtained. About 30 parts of this solution was cast in a thick layer about 4 inches wide across a glass plate. Immediately a 4-inch, 8-mil film was prepared from the dope, along the length of the glass. The film was allowed to air-dry on the glass plate for 20 seconds, and then the entire plate was immersed in water. An opaque, white, asymmetric film was thereby formed and stored under water thereafter. Films of cellulose acetate only were similarly prepared.

The blended films thus consisted of a 50/50 mixture of cellulose acetate-phthalate (CAPh) and cellulose acetate (CA). Circles of 47 mm in diameter were punched out of the films (wet), and two such films were laid, one on top of the other, in a Gelman pressure filtration funnel for testing as described below. The cellulose acetate film served as the control. Each 47 mm circle contained about 50 milligrams of polymeric material. Effective diameter of film in the test pressure filtration unit was 35 mm.

A 10 percent weight solution of $Na_2Mg$ (EDTA) was passed through the above films under an applied pressure sufficient to collect eluent at about 0.5 ml. per minute. An applied pressure in the range 50 to 150 psi was sufficient.

In order to test the heavy metal pollutant removal capacity of this film, 161 parts per million solutions of aqueous mercuric (II) nitrate were prepared and passed through the films under pressure. The polluting solution was passed through the film and 10-ml samples were collected sequentially for evaluation of mercury content. Specifically, the mercury content was determined by adding an excess known amount of EDTA to the sample solution and titrating the unreacted EDTA with a standard magnesium sulfate solution using Eriochrome Black T indicator. The results are plotted in FIGS. 1 and 2.

Figure 2:
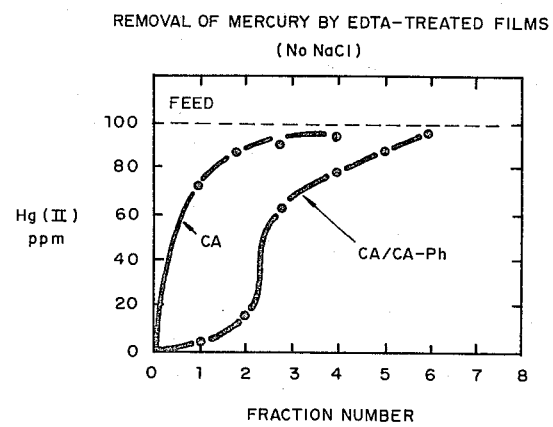

As can be seen from FIGS. 1 and 2, a point is reached at about fraction No. 4 wherein the removal of mercury decreases significantly. Thus, at this point, there would be a need to replace the film with regenerated film which could be accomplished by recirculating the film through a thiocyanate bath.

Untreated CA and 50/50 CA/CAPh films were tested for mercury (II) removal with results that are plotted in FIG. 1. The feed solution concentration, dotted line, was 100 ppm mercury. It is apparent that CA itself removed very little mercuric ion while the CAPh in the 50/50 CA/CAPh film removed an appreciable amount. Through fraction 3, i.e., 30 ml cumulative volume, practically all the mercury was removed. Breakthrough occurred after fraction 3. Each 10 ml of feed contained one milligram mercury, or 0.01 milliequivalent (meq). Through fraction 9, a total of about 0.04 meq mercury had been removed by 28 milligrams CAPh, or about 0.082 meq CAPh. This ratio is about one meq mercury per two meq CAPh.

EXAMPLE 2

In FIG. 2, the results are shown for the removal of mercury from a 100 ppm mercury feed solution, with EDTA-treated films of (1) CA and (2) 50/50 CA/CAPh. The data show again that CA itself removed a minor amount of mercury, similar to the result obtained with untreated film CA film in FIG. 1, while the CAPh removed an appreciable amount.

EXAMPLE 3

A column of powdered alginic acid in the same fashion removed mercuric ions from aqueous solutions.

EXAMPLE 4

In examples 1 through 3, the material remaining behind (retentate) after the filtration operation was analyzed to determine whether the decrease in mercury concentration resulted from retention of mercury rather than cleansing by the film. No increase in mercury concentration was observed.

EXAMPLE 5

Figure 3:
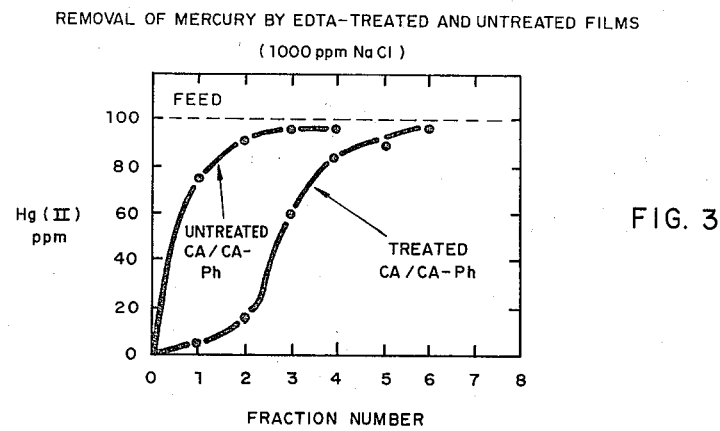

FIG. 3 represents a situation of practical significance where mercury is selectively removed from a feed solution containing a much higher concentration of sodium chloride by 50/50 CA/CAPh treated with Mg-EDTA. Untreated CA/CAPh films removed very little mercury from saline solutions.

EXAMPLE 6

Figure 4:
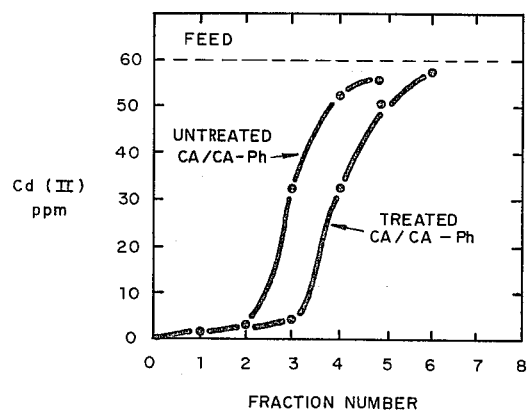

Cellulose acetate-phthalate films were prepared according to the process of Example 1. One film was treated with EDTA according to the process of Example 1 while the other section of film remained untreated. A 56 ppm cadmium (II) (nitrate) solution was forced through the films according to the process of claim 1. The results of this test are shown in FIG. 4. Since no other ions (such as sodium ions in Example 7) are present, the free carboxyl groups in the untreated film react and to a certain extent remove the cadmium ions, as shown in Examples 1 and 2 for mercuric ions, although the degree of removal as shown in FIG. 4 is somewhat less with the untreated than with the treated films.

EXAMPLE 7

Figure 5:
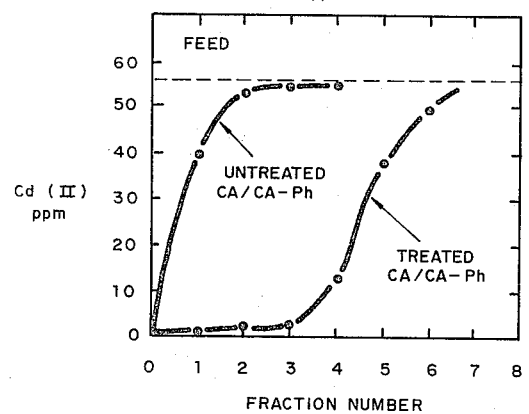

Example 1 is repeated, utilizing a 56 ppm cadmium feed containing 1,000 ppm of sodium chloride. The results are shown in FIG. 5. The cadmium was selectively removed by an EDTA-treated CA/CAPh film, but not by the untreated film. In the untreated film, the carboxyl groups are consumed by reaction with the sodium ions present and therefore cannot remove the heavy metal ions from the saline solution. Practically all of the cadmium was removed through fraction 6, a total of 0.042 milliequivalents.

EXAMPLE 8

The films of Example 1 after use were subject to thiocyanate treatment by passing a 10 percent by weight aqueous solution of potassium thiocyanate through the exhausted film. The wash material was removed. The films were cleaned with water, and subject again to treatment with essentially the same results as in Example 1.

Other possible configurations of the instant invention include the use of a bed or column whereby beads of the EDTA treated acidic polymer are subject to water containing the pollutants. In addition, the polymers of the instant invention may be used in the form of continuous spans of film, fiber toes, spiral rolls and the like.

We claim:

1. A process for removing pollutant heavy metal cations from an aqueous media containing same which comprises passing said pollutant-containing aqueous media through a substantially water insensitive, flexible base, porous polymeric film thereby forming a complex with the pollutant metal cations to be removed from the aqueous media, said film being prepared from a polymer containing from about 0.01 to 3.0 free hydroxyl groups per gram of polymer which has been reacted with a polyfunctional carboxylic or sulfonic acid or anhydride to produce an acid-containing polymer and subsequently contacted with a divalent metal chelate which is not subject to water degradation.

2. The process of claim 1 wherein the log of the stability constant of the divalent metal chelate is at least 3 points higher than the log of the stability constant of its corresponding sodium or potassium chelate.

3. The process of claim 1 wherein the polymeric film is cellulose acetate.

4. The process of claim 1 wherein the polyfunctional anhydride is phthalic anhydride.

5. The process of claim 1 wherein the divalent metal chelate is ethylenediaminetetracetic acid.

* * * * *